United States Patent Office 3,576,935
Patented Apr. 27, 1971

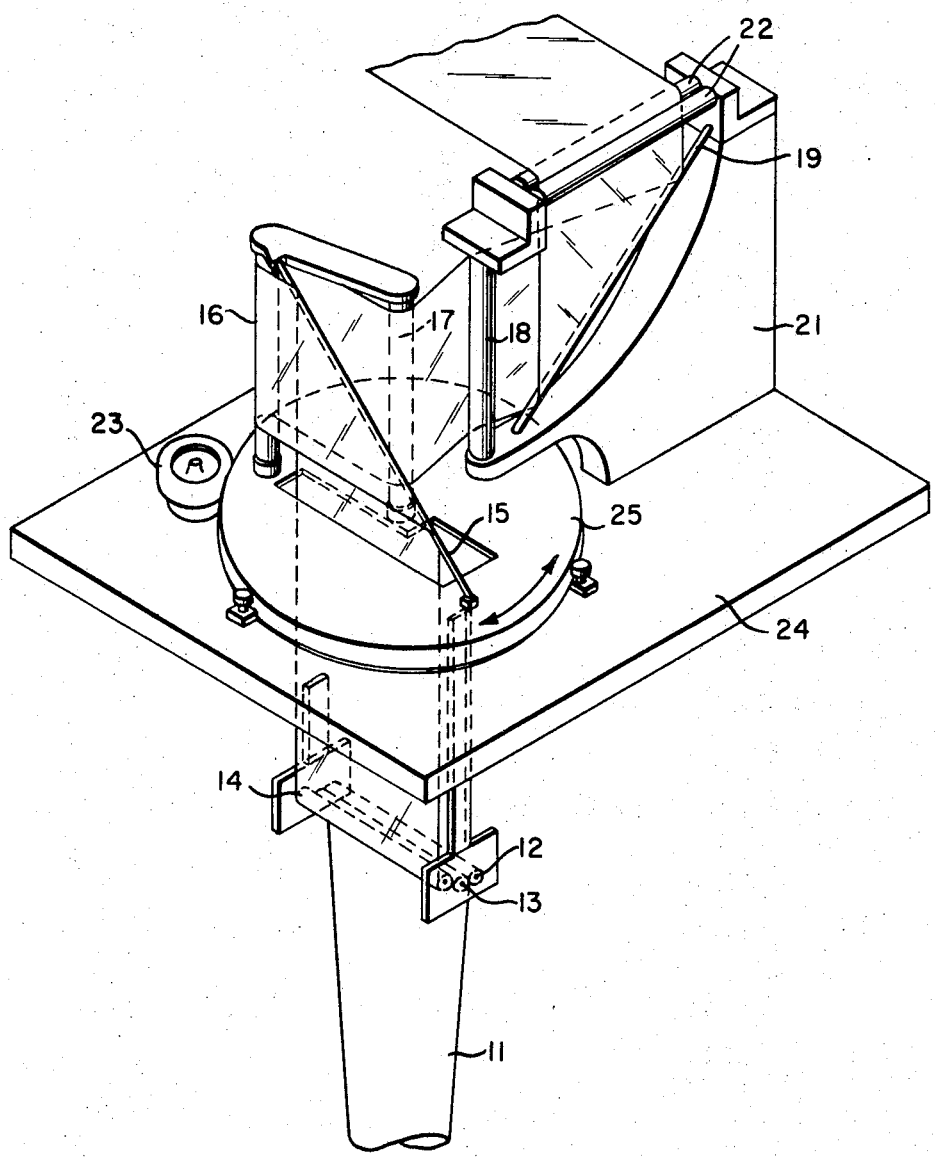

3,576,935
APPARATUS FOR AND METHOD OF GAUGE DISTRIBUTION IN PLASTIC TUBING
Gerald Benjamin Dyer, Kingston, Ontario, and Peter H. Gray, Reddendale, Ontario, Canada, assignors to E. I. du Pont de Nemours and Company, Wilmington, Del.
Filed May 20, 1969, Ser. No. 826,153
Int. Cl. B29d 7/24
U.S. Cl. 264—95                        6 Claims

ABSTRACT OF THE DISCLOSURE

Method of producing thermoplastic film including the steps of extruding thermoplastic material from an annular die in the form of a tube; transporting the tube in a first direction away from the annular die; flattening the tube by passing it between a pair of nip rolls; changing the path of travel of the flattened tube from the first direction to a direction of 90° to the first direction; turning the flattened tube about a line which is coaxial with the annular die, the nip rolls being oscillated relative to the annular die; and, passing the flattened tube into contact with a takeoff roll which is fixed relative to the annular die, the distance between the takeoff roll and the line about which the flattened tube is turned remaining constant during the oscillating motion. Apparatus is provided for performing the above method.

This invention relates to the extrusion of thermoplastic material and more particularly to an improved method and apparatus for continually extruding such thermoplastic material in the form of inflated tubing, subsequently flattening said tubing, and winding to form a roll.

It is known that thermoplastic materials may be extruded in tubular form, inflated to a desired diameter, quenched and later flattened to form film.

Present day methods however, involve certain difficulties associated with the unavoidable irregularities that occur in the thickness of such tubular film around its circumference. Such irregularities are usually caused by imperfect die construction or adjustment, or imperfect application of quench media to the molten tube. Unless these irregularities are eliminated, which is virtually impossible, they must be shifted continuously in a circumferential direction before winding in order that a cumulative effect on the roll may be avoided.

Such shifting is usually achieved by a relatively slow reciprocating or total rotation of the die or quench apparatus about the axis of the inflated tube. Yet another method is to hold the die and quench apparatus stationary while the nip roll and winding assemblies are slowly rotated about the central axis of the inflated tube as they receive and wind up the flattened tube.

It is therefore an object of the present invention to escape from the complexities and expense involved in providing rotatable dies and quench apparatus.

It is also an object of the present invention to eliminate the inconvenience of a moving windup assembly.

Accordingly, the present invention provides means of changing the direction of the flattened tube permitting the use of a stationary die, take-off and windup assembly, while the nip roll assembly used to flatten the extruded tube is caused to oscillate. In this manner, the randomizing of irregularities in the film is accomplished.

There is also provided a process for producing thermoplastic film which comprises:

extruding thermoplastic material which is suitable for dry extrusion from an annular die in the form of a tube; transporting said tube in a first direction away from said annular die;

flattening said tube by passing said tube between a pair of nip rolls;
changing the path of travel of said flattened tube from said first direction to a direction at 90° to said first direction;
turning said flattened tube about a line which is coaxial with said annular die, said nip rolls being oscillated relative to said extruder;
passing said flattened tube into contact with a take-off roll which is fixed relative to said extruder, the distance between said take-off roll and said line about which said flattened tube is turned remaining constant during said oscillating motion.

In addition, there is provided an apparatus for producing thermoplastic film which comprises:

an extruder with associated annular extrusion die adopted to form a tubular film;
means to transport said film away from said die and a film windup;
the improvement comprising:
a platform adapted to oscillate about an axis which is coaxial with the axis of said annular extrusion die;
and mounted on said platform:

means to flatten said thermoplastic tube;
a roll to offset said flattened tube from the axis of said platform;
means to change the direction of travel of the flattened tube from said first direction away from said die to a direction at 90° to said first direction;
means to direct the flattened tube over a central roll mounted on the axis of rotation of said platform;
a take-up roll assembly mounted so as to be stationary relative to said extruder and film windup, such that the distance between said central roll and said take-up roll remains constant during the oscillation of said platform.

These and other objects of the present invention will become evident from the more detailed description set forth below, it being understood that such more detailed description is given by way of illustration and explanation only and not by way of limitation, since various changes therein may be made by those skilled in the art without departing from the scope or spirit of the present invention.

In connection with that more detailed description:
FIG. 1 is an isometric sketch of an oscillating nip roll assembly of the present invention.

Referring to FIG. 1, the inflated thermoplastic tube 11 is shown advancing vertically from an annular extrusion die (not shown) to be collapsed or flattened, by the nip rolls 12 and 13 mounted on the oscillating platform 25. The flattened tube then passes under an off-setting idler roll 14—the purpose of which will be later seen— and thence to a skew bar 15 which is also mounted on the oscillating platform 25 and arranged to form an angle of 45° to the vertical. This skew bar changes the direction of travel of the flattened tube from vertical to horizontal.

Idler roll 16 redirects the flattened tube to a centrally located idler 17. Because the center line of roll 17 is located on the rotating axis of oscillating platform 25 and is coaxial with the extrusion die, this roll 17 is always stationary with respect to the take-off 21. Therefore, transfer to the take-off assembly is always over a fixed distance between idler rolls 17 and 18. It can now be seen that off-setting by roll 14 is necessary in order that roll 17 may be properly located. A further change in direction over skew bar 19 permits delivery of the flattened tube to a conventional horizontal windup (not shown). The motor driven nip roll assembly 22 performs the function of pulling the tube through the complete train of rolls and bars (12 to 19 inclusive), and preferably is powered by a constant torque device that will generate constant tension in the flattened tube.

The oscillating platform 25 is driven by a pneumatic tire 23 itself driven by a reversing motor mounted below the stationary platform 24. Limit switches (not shown), may be used to control the amplitude of rotational oscillation to a maximum of approximately 180°. Any other type of more conventional drive, such as chain and sprocket or worm and gear may, of course, be utilized for this purpose.

Thermoplastic materials which may be used in the practice of the present invention are those thermoplastics which are suitable for dry extrusion and include:

polyethylene, polypropylene, and other polyolefins, homopolymers and copolymers thereof,
polyamide,
polystyrene, and
polyvinylchloride.

We claim:
1. A process for producing thermoplastic film which comprises:
extruding thermoplastic material which is suitable for dry extrusion from an annular die in the form of a tube;
transporting said tube in a first direction away from said annular die;
flattening said tube by passing said tube between a pair of nip rolls;
changing the path of travel of said flattened tube from said first direction to a direction at 90° to said first direction;
turning said flattened tube about a member whose axis is mounted coaxial with said annular die, said nip rolls and said member being oscillated relative to said extruder;
passing said flattened tube into contact with a takeoff roll which is fixed relative to said extruder, the distance between said take-off roll and said member about which said flattened tube is turned remaining constant during said oscillating motion.
2. The process as claimed in claim 1 in which said thermoplastic material is selected from a list comprising:
polyethylene, polypropylene, and other polyolefins, homopolymers and copolymers thereof,
polyamide,
polystyrene, and
polyvinylchloride.
3. A process for producing thermoplastic film which comprises:
extruding thermoplastic material which is suitable for dry extrusion from an annular die in the form of a tube;
transporting said tube in a first direction away from said annular die;
flattening said tube by passing said tube between a pair of nip rolls;
changing the path of travel of said flattened tube from said first direction to a direction at 90° to said first direction by means of a suitable roll and skew bar arrangement;
turning said flattened tube about a central roll which is mounted coaxially with said annular die, said nip rolls and said roll and skew bar arrangement being oscillated relative to said extruder;
passing said flattened tube into contact with a take-off roll which is fixed relative to said extruder, the distance between said take-off roll and said central roll remaining constant during said oscillating motion.
4. The process as claimed in claim 3 in which said thermoplastic material is selected from a list comprising:
polyethylene, polypropylene, and other polyolefins, homopolymers and copolymers thereof,
polyamide,
polystyrene, and
polyvinylchloride.
5. In apparatus for producing thermoplastic film which comprises:
an extruder with associated annular extrusion die adapted to form a tubular film,
means to transport said film away from said die; and a film windup;
the improvement comprising:
a platform adapted to oscillate about an axis which is coaxial with the axis of said annular extrusion die;
and mounted on said platform:
means to flatten said thermoplastic tube;
a roll to offset said flattened tube from the axis of said platform;
means to change the direction of travel of the flattened tube from said first direction away from said die to a direction at 90° to said first direction;
means to direct the flattened tube over a central roll mounted on the axis of rotation of said platform;
a takeup roll assembly mounted so as to be stationary relative to said extruder and film windup;
such that the distance between said central roll and said takeup roll remains constant during the oscillation of said platform.
6. In an apparatus for producing thermoplastic film which comprises:
an extruder with associated annular extrusion die adapted to form a tubular film;
means to transport said film away from said die; and a film windup;
the improvement comprising:
a platform adapted to oscillate about an axis which is coaxial with the axis of said annular die, and mounted on said platform;
a nip roll assembly to flatten said thermoplastic tube;
a roll to offset said flattened tube from the axis of said platform;
a skew bar to change the direction of travel of said flattened tube from said first direction away from said die to a direction at 90° to said first direction;
a roll to reverse the direction of said flattened tube and direct said flattened tube towards a central roll mounted on the axis of rotation of said platform;
a takeup roll mounted so as to be stationary relative to said extruder and film windup, such that the distance between said central roll and said takeup roll remains constant during the oscillation of said platform;
a second skew bar to change the direction of travel of said flattened tube; and
a pair of nip rolls to transport said flattened tube to said film windup.

References Cited
UNITED STATES PATENTS
3,492,693  2/1970  Clarke et al. _____ 18—14

ROBERT F. WHITE, Primary Examiner
T. J. CARVIS, Assistant Examiner

U.S. Cl. X.R.
264—209; 18—14